US012697922B2

(12) United States Patent (10) Patent No.: US 12,697,922 B2
Morgan et al. (45) Date of Patent: Aug. 4, 2026

(54) GOLF BAG RETENTION YOKE WITH INTEGRATED BEVERAGE CONTAINER HOLDER AND/OR GOLF TEE HOLDER

(71) Applicant: Textron Inc., Providence, RI (US)

(72) Inventors: Paul Edward Morgan, Appling, GA (US); Marissa Leigh Swart, Martinez, GA (US)

(73) Assignee: TEXTRON INNOVATIONS INC., Providence, RI (US)

( * ) Notice: Subject to any disclaimer, the term of this patent is extended or adjusted under 35 U.S.C. 154(b) by 349 days.

(21) Appl. No.: 18/452,280

(22) Filed: Aug. 18, 2023

(65) Prior Publication Data

US 2025/0058716 A1 Feb. 20, 2025

(51) Int. Cl.
| *B60R 9/08* | (2006.01) |
| *A63B 55/60* | (2015.01) |
| *A63B 57/20* | (2015.01) |
| *B60N 3/10* | (2006.01) |

(52) U.S. Cl.
CPC ................ B60R 9/08 (2013.01); A63B 55/61 (2015.10); A63B 57/203 (2015.10); B60N 3/101 (2013.01); *A63B 2225/682* (2013.01)

(58) Field of Classification Search
CPC ......... B60R 9/08; A63B 55/61; A63B 57/203; A63B 2225/682; B60N 3/101
See application file for complete search history.

(56) References Cited

U.S. PATENT DOCUMENTS

| 4,302,029 A | 11/1981 | Albertson |
| 4,648,612 A | 3/1987 | Park |
| 4,767,001 A | 8/1988 | Kim |
| 5,088,635 A | 2/1992 | Taylor et al. |
| 5,361,958 A | 11/1994 | Fiegel et al. |
| 5,465,930 A | 11/1995 | Wu |
| 5,472,084 A | 12/1995 | Aliano |
| 5,480,078 A | 1/1996 | Verette et al. |
| 5,556,064 A | 9/1996 | Cowe |
| 5,573,211 A | 11/1996 | Wu |
| 5,599,037 A | 2/1997 | Spickler |
| 5,671,842 A | 9/1997 | Jaworski |

(Continued)

FOREIGN PATENT DOCUMENTS

| AU | 6440399 A | 6/2000 |
| CN | 2768845 Y | 4/2006 |

(Continued)

OTHER PUBLICATIONS

Jaxpare Golf Cart Portable Cooler Bag; Amazon.com.au product webpage; https://www.amazon.com.au/Jaxpare-Portable-Cooler-Precedent-Basket-Multipurpose/dp/B0C7QSHNW6; accessed on Sep. 30, 2025; published on Jun. 12, 2023. (Year: 2023).*

*Primary Examiner* — Daniel J Colilla

(74) *Attorney, Agent, or Firm* — Sandberg Phoenix & von Gontard, P.C.

(57) ABSTRACT

A golf bag retention yoke comprising at least one beverage container holder well and/or at least one golf tee holder aperture integrally formed therein. The at least one beverage container holder is structured and operable to removably retain a beverage container and the least one golf tee holder aperture structured and operable to removably retain a golf tee.

14 Claims, 7 Drawing Sheets

(56)          References Cited

U.S. PATENT DOCUMENTS

| | | | |
|---|---|---|---|
| 6,019,324 | A | 2/2000 | Wu |
| 6,508,359 | B1 | 1/2003 | He |
| 6,510,944 | B2 | 1/2003 | Chang |
| 6,513,652 | B1 | 2/2003 | Solheim et al. |
| 6,598,889 | B1 | 7/2003 | Su |
| 6,758,334 | B2 | 7/2004 | Uner et al. |
| 7,229,080 | B2 | 6/2007 | Haugen |
| 7,481,311 | B1 | 1/2009 | Old |
| 7,581,748 | B2 | 9/2009 | Reimers |
| 9,480,892 | B2 | 11/2016 | Loudenslager et al. |
| 9,610,485 | B2 | 4/2017 | Lewter |
| 9,895,586 | B2 | 2/2018 | Hecht |
| 10,377,402 | B2 | 8/2019 | Ho |
| 10,569,716 | B1 | 2/2020 | Law et al. |
| 2003/0159864 | A1* | 8/2003 | Furuta .................. B62B 5/0438 |
| | | | 180/65.1 |
| 2006/0181041 | A1 | 8/2006 | Feldman |
| 2006/0219581 | A1 | 10/2006 | Wohlwender |
| 2006/0272967 | A1 | 12/2006 | Bremner |
| 2007/0210126 | A1 | 9/2007 | Hanson et al. |
| 2010/0133308 | A1* | 6/2010 | Hardy ..................... B60R 11/00 |
| | | | 224/547 |
| 2012/0085666 | A1 | 4/2012 | Mcguire |
| 2012/0261447 | A1* | 10/2012 | Bryant ...................... B60R 9/08 |
| | | | 224/274 |
| 2013/0153615 | A1 | 6/2013 | Gibson |
| 2016/0303442 | A1* | 10/2016 | Tran ........................ A63B 55/30 |
| 2017/0108860 | A1* | 4/2017 | Doane ................. G05D 1/0255 |
| 2018/0214752 | A1 | 8/2018 | Burgess |
| 2023/0051119 | A1 | 2/2023 | Broadwell |

FOREIGN PATENT DOCUMENTS

| | | | |
|---|---|---|---|
| CN | 2768847 | Y | 4/2006 |
| CN | 216536809 | U | 5/2022 |
| DE | 102004040641 | A | 3/2006 |
| FR | 2661837 | A3 | 11/1991 |
| FR | 3000680 | A1 | 7/2014 |
| JP | 3086561 | U | 6/2002 |
| JP | 3094260 | U | 6/2003 |
| KR | 910000200 | A | 1/1991 |
| KR | 960010600 | Y1 | 12/1996 |
| KR | 200180111 | Y1 | 4/2000 |
| KR | 200204828 | Y1 | 12/2000 |
| KR | 200240115 | Y1 | 10/2001 |
| KR | 200353569 | Y1 | 6/2004 |
| KR | 20040069714 | A | 8/2004 |

* cited by examiner

GOLF BAG RETENTION YOKE WITH INTEGRATED BEVERAGE CONTAINER HOLDER AND/OR GOLF TEE HOLDER

FIELD

The present teachings relate to golf car accessory storage, and particularly to a golf car comprising a golf bag retention yoke having integrally formed therein at least one cup holder well and at least one golf tee holder aperture.

BACKGROUND

The statements in this section merely provide background information related to the present disclosure and may not constitute prior art.

It is common for golfers to store and consume beverages while playing a round of golf. Accordingly, it is desirable to have one or more beverage holder (often generically referred to as a cup holder) provided on the golf car to hold the golfer's beverage, particularly the golfer's beverage container e.g., a cup, can or bottle. Known golf cars typically provide one or more such cup holders provided in an interior space or area of the golf car passenger compartment such that they are not conveniently accessible by a golfer standing outside the golf car and not seated within the passenger compartment. Similarly, golf tee retention apertures (often generically referred to as a tee holders) are typically provided in the dash console within the interior space or area of the golf car passenger compartment such that they also are not conveniently accessible by a golfer standing outside the golf car and not seated within the passenger compartment.

SUMMARY

In various embodiments, the present disclosure provides a golf bag retention yoke comprising at least one beverage container holder well and/or at least one golf tee holder aperture integrally formed therein. The at least one beverage container holder is structured and operable to removably retain a beverage container and the least one golf tee holder aperture structured and operable to removably retain a golf tee.

In various other embodiments, the present disclosure provided a golf bag retention yoke comprising at least one golf tee holder aperture structured and operable to removably retain a golf tee.

In yet other embodiments, the present disclosure provides A golf car comprising a golf bag retention yoke, wherein the golf bag retention yoke comprises at least one beverage container holder well integrally formed therein. The at least one beverage container holder is structured and operable to removably retain a beverage container. The golf bag retention yoke further comprises at least one golf tee holder aperture structured and operable to removably retain a golf tee.

This summary is provided merely for purposes of summarizing various example embodiments of the present disclosure so as to provide a basic understanding of various aspects of the teachings herein. Various embodiments, aspects, and advantages will become apparent from the following detailed description taken in conjunction with the accompanying drawings which illustrate, by way of example, the principles of the described embodiments. Accordingly, it should be understood that the description and specific examples set forth herein are intended for purposes of illustration only and are not intended to limit the scope of the present teachings.

DRAWINGS

The drawings described herein are for illustration purposes only and are not intended to limit the scope of the present teachings in any way.

Corresponding reference numerals indicate corresponding parts throughout the several views of drawings.

DETAILED DESCRIPTION

Figure 1:
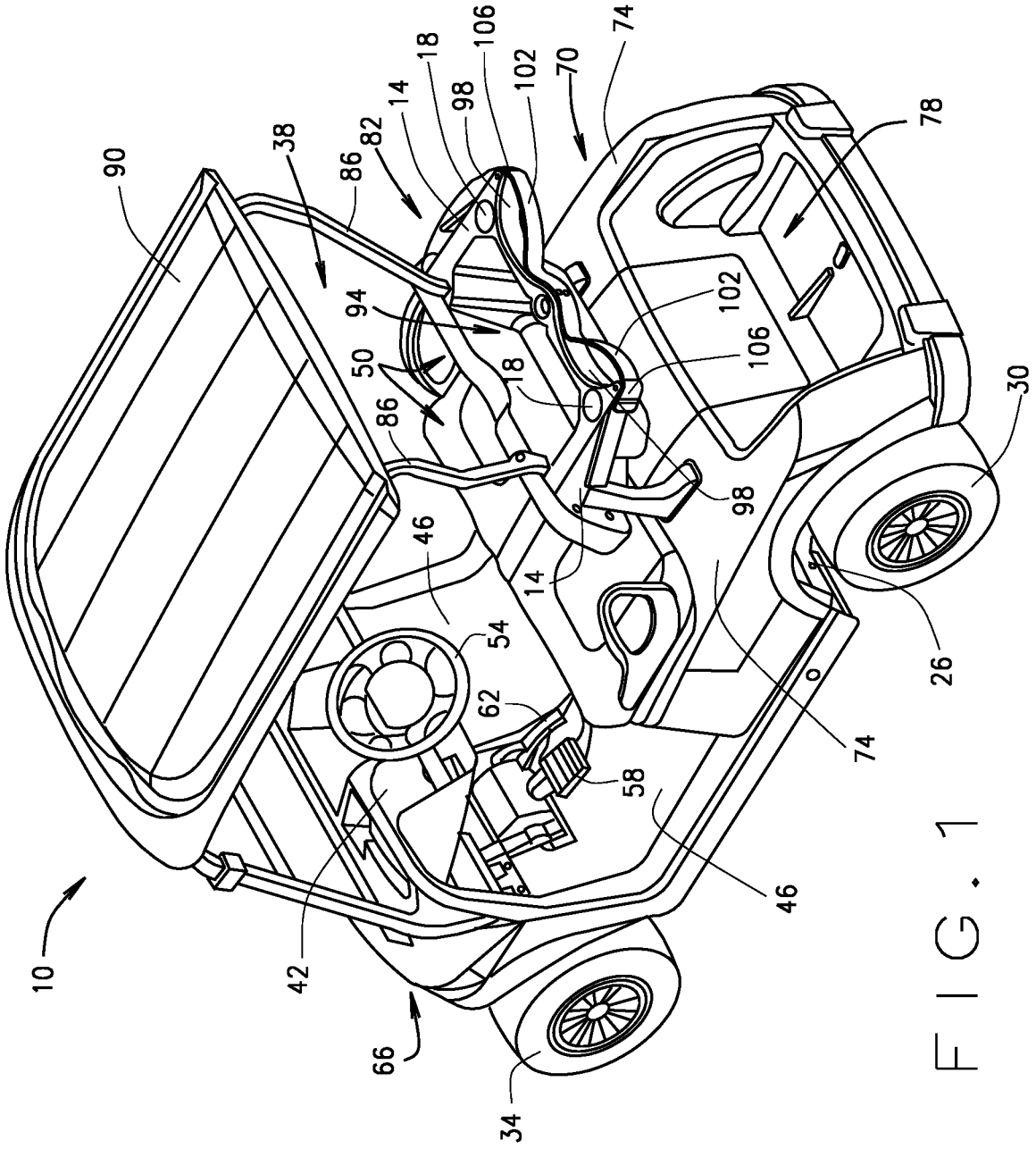
FIG. 1 is an exemplary isometric view of a golf car comprising a golf bag retention yoke having integrally formed therein at least one cup holder well, in accordance with various embodiments of the present disclosure.

The following description is merely exemplary in nature and is in no way intended to limit the present teachings, application, or uses. Throughout this specification, like reference numerals will be used to refer to like elements. Additionally, the embodiments disclosed below are not intended to be exhaustive or to limit the invention to the precise forms disclosed in the following detailed description. Rather, the embodiments are chosen and described so that others skilled in the art can utilize their teachings. As well, it should be understood that the drawings are intended to illustrate and plainly disclose presently envisioned embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims.

Unless otherwise defined, all technical and scientific terms used herein have the same meaning as commonly understood by one of ordinary skill in the art to which this disclosure belongs. The terminology used herein is for the purpose of describing particular example embodiments only and is not intended to be limiting. As used herein, the singular forms "a", "an", and "the" may be intended to include the plural forms as well, unless the context clearly indicates otherwise. The terms "comprises", "comprising", "including", and "having" are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps can be employed.

When an element, object, device, apparatus, component, region or section, etc., is referred to as being "on", "engaged to or with", "connected to or with", or "coupled to or with" another element, object, device, apparatus, component, region or section, etc., it can be directly on, engaged, connected or coupled to or with the other element, object, device, apparatus, component, region or section, etc., or intervening elements, objects, devices, apparatuses, components, regions or sections, etc., can be present. In contrast, when an element, object, device, apparatus, component, region or section, etc., is referred to as being "directly on", "directly engaged to", "directly connected to", or "directly coupled to" another element, object, device, apparatus, component, region or section, etc., there may be no intervening elements, objects, devices, apparatuses, components, regions or sections, etc., present. Other words used to describe the relationship between elements, objects, devices, apparatuses, components, regions or sections, etc., should be interpreted in a like fashion (e.g., "between" versus "directly between", "adjacent" versus "directly adjacent", etc.).

As used herein the phrase "operably connected to" will be understood to mean two are more elements, objects, devices, apparatuses, components, etc., that are directly or indirectly connected to each other in an operational and/or cooperative manner such that operation or function of at least one of the elements, objects, devices, apparatuses, components, etc., imparts or causes operation or function of at least one other of the elements, objects, devices, apparatuses, components, etc. Such imparting or causing of operation or function can be unilateral or bilateral.

As used herein, the term "and/or" includes any and all combinations of one or more of the associated listed items. For example, A and/or B includes A alone, or B alone, or both A and B.

Although the terms first, second, third, etc. can be used herein to describe various elements, objects, devices, apparatuses, components, regions or sections, etc., these elements, objects, devices, apparatuses, components, regions or sections, etc., should not be limited by these terms. These terms may be used only to distinguish one element, object, device, apparatus, component, region or section, etc., from another element, object, device, apparatus, component, region or section, etc., and do not necessarily imply a sequence or order unless clearly indicated by the context.

Moreover, it will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation. Because many varying and different embodiments may be made within the scope of the concept(s) taught herein, and because many modifications may be made in the embodiments described herein, it is to be understood that the details herein are to be interpreted as illustrative and non-limiting.

Figure 2:
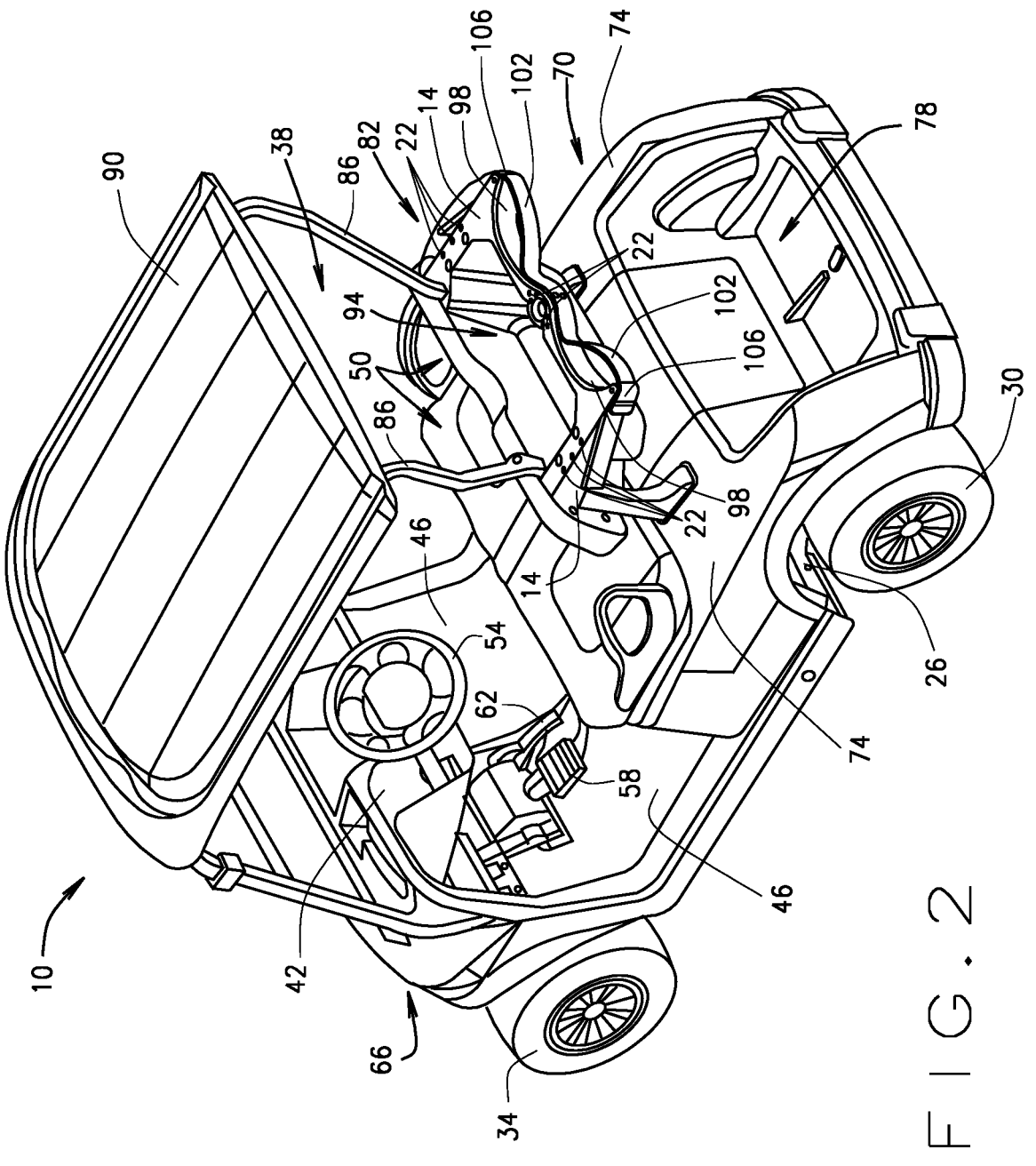
FIG. 2 is an exemplary isometric view of a golf car comprising the golf bag retention yoke shown in FIG. 1 having integrally formed therein at least one golf tee holder aperture, in accordance with various embodiments of the present disclosure.
Figure 3:
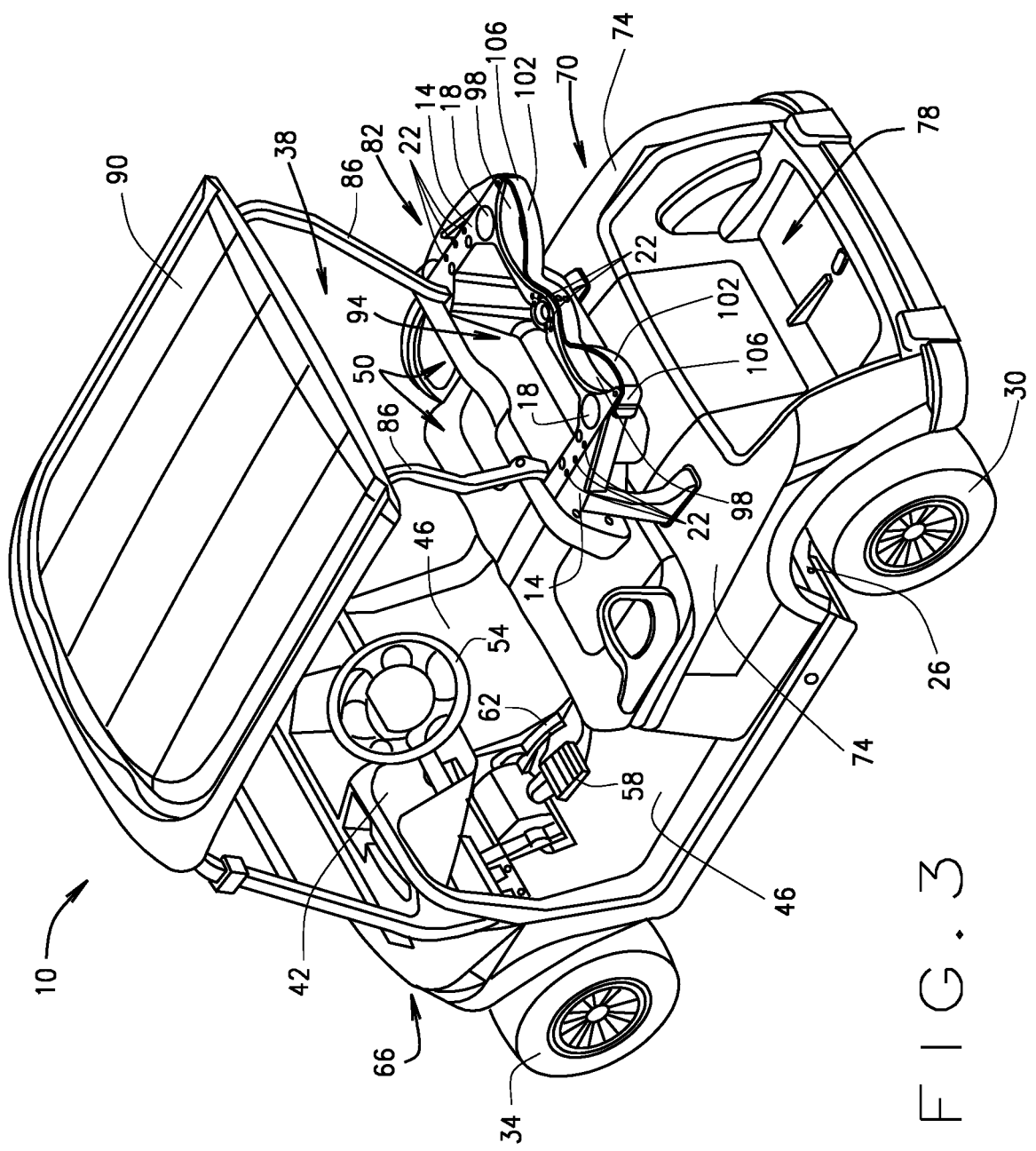
FIG. 3 is an exemplary isometric view of a golf car comprising the golf bag retention yoke shown in FIG. 1 having integrally formed therein at least one cup holder well and/or at least one golf tee holder aperture, in accordance with various embodiments of the present disclosure.
Figure 4:
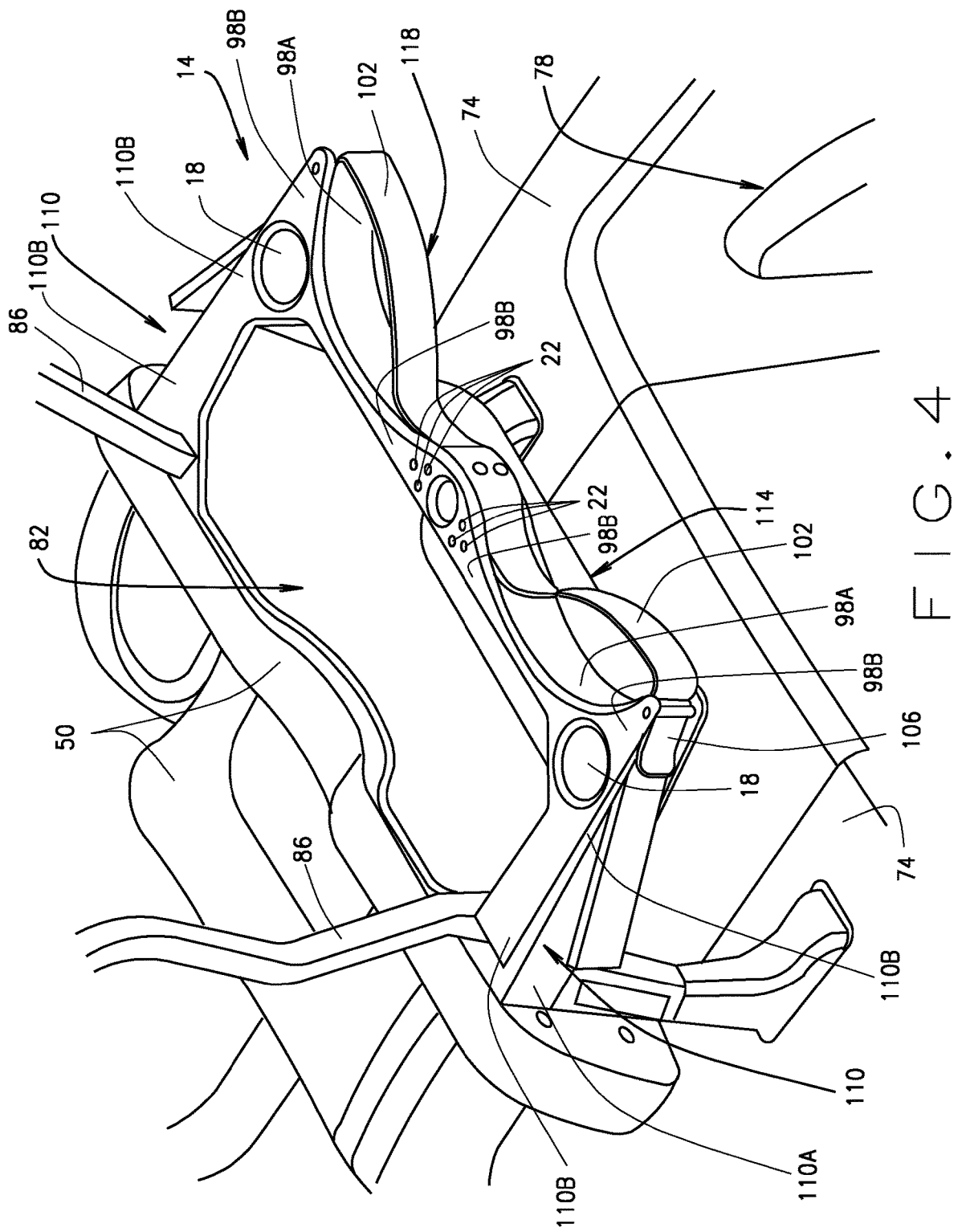
FIG. 4 is an isometric view of an accessory basket and yoke combination structure comprising the golf bag retention yoke shown in FIG. 1, wherein the golf bag retention yoke has integrally formed therein at least one cup holder well and/or at least one golf tee holder aperture, in accordance with various embodiments of the present disclosure.
Figure 5:
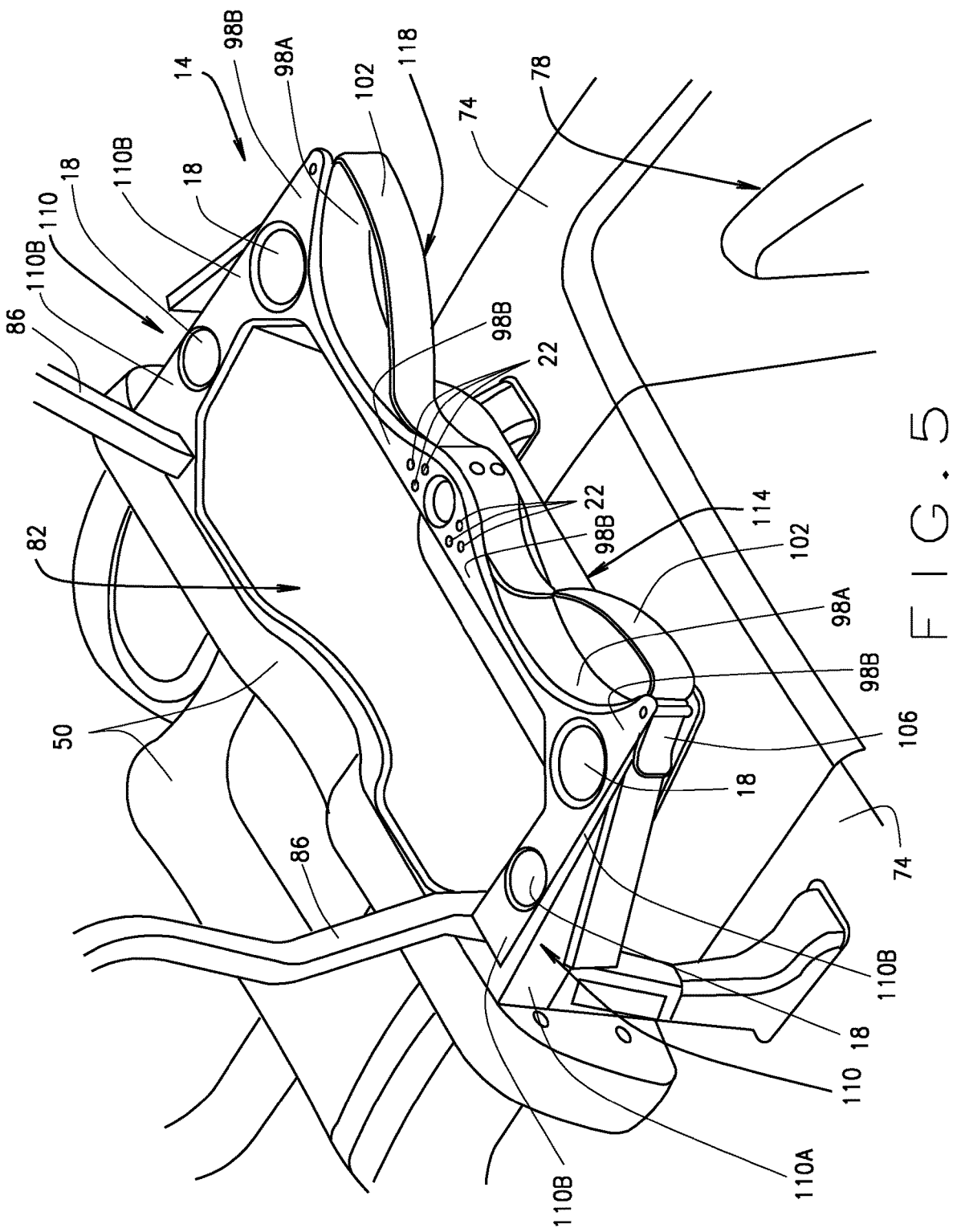
FIG. 5 is an isometric view of the accessory basket and yoke combination structure comprising the golf bag retention yoke shown in FIG. 1, wherein the golf bag retention yoke has integrally formed therein at least one cup holder well and/or at least one golf tee holder aperture, in accordance with various other embodiments of the present disclosure.
Figure 6:
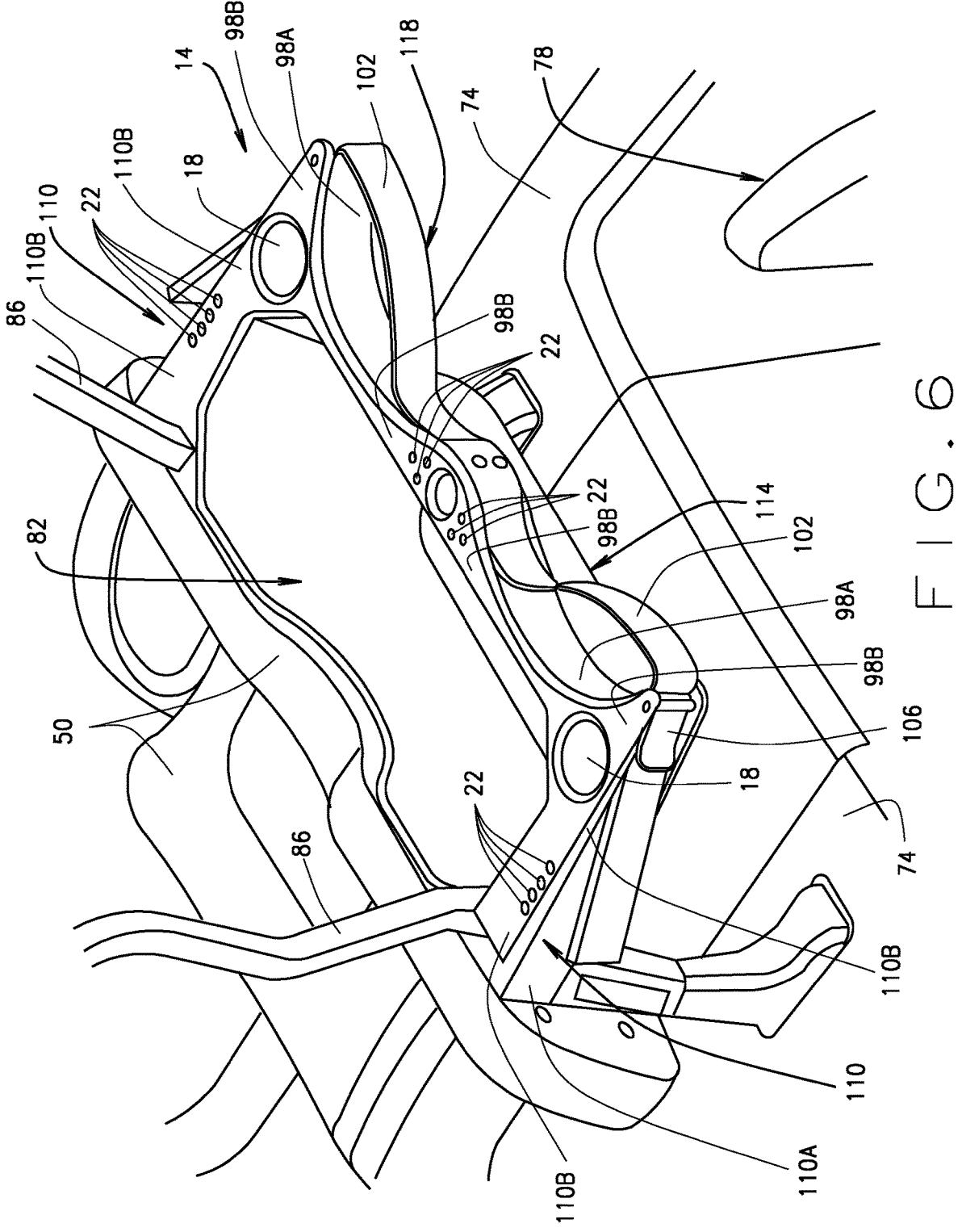
FIG. 6 is an isometric view of the accessory basket and yoke combination structure comprising the golf bag retention yoke shown in FIG. 1, wherein the golf bag retention yoke has integrally formed therein at least one cup holder well and/or at least one golf tee holder aperture, in accordance with yet other embodiments of the present disclosure.
Figure 7:
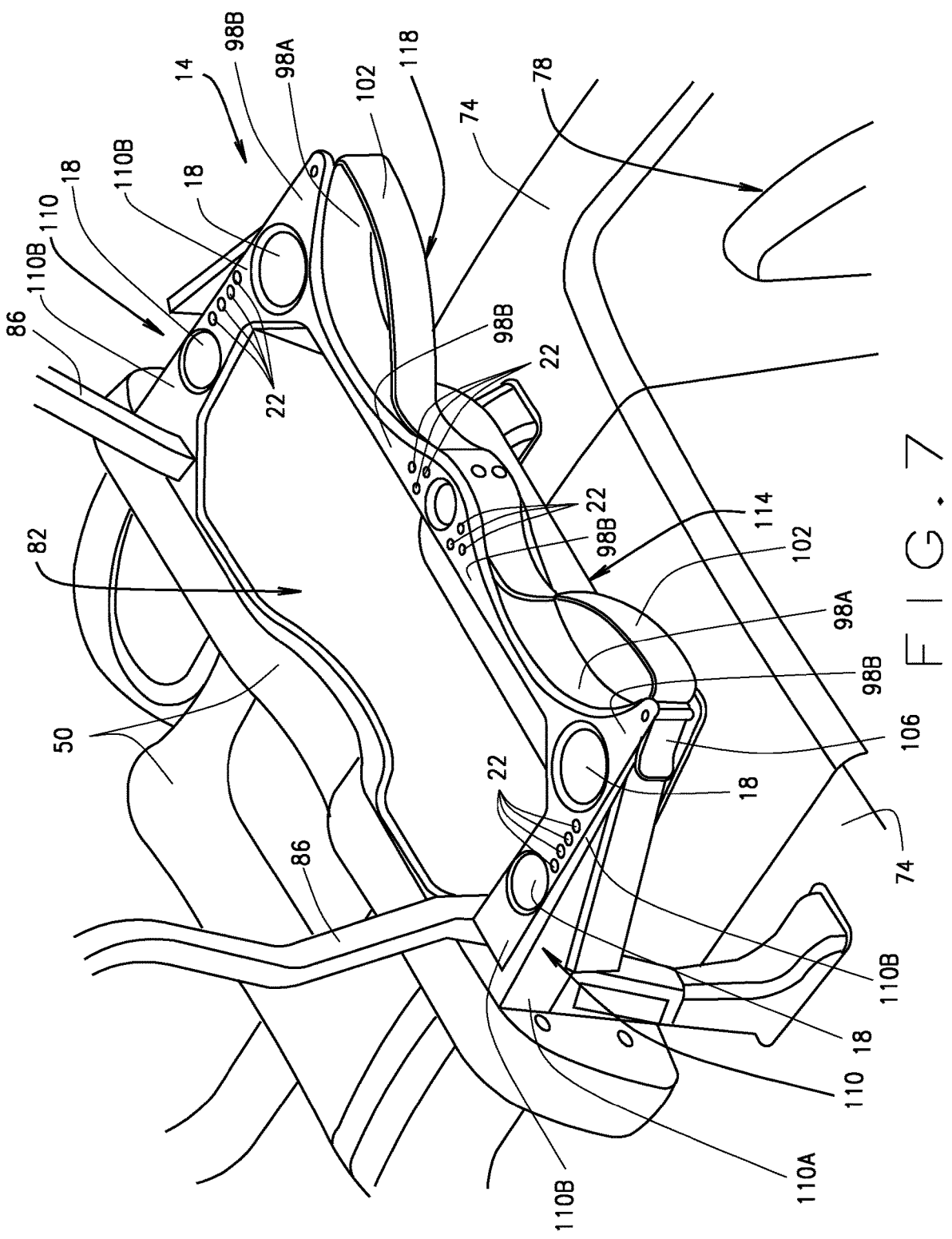
FIG. 7 is an isometric view of the accessory basket and yoke combination structure comprising the golf bag retention yoke shown in FIG. 1, wherein the golf bag retention yoke has integrally formed therein at least one cup holder well and/or at least one golf tee holder aperture, in accordance with still yet other embodiments of the present disclosure.

Referring now to FIGS. 1, 2 and 3, in various embodiments, the present disclosure generally provides a golf car 10 comprising a golf bag retention yoke 14 having integrally formed therein at least one beverage container holder well 18 structured and operable to removably retain a beverage container such as a cup, can, bottle, thermos etc. while the golf car 10 is stationary and while the golf car 10 is moving. In various other embodiments, the present disclosure generally provides the golf car 10 comprising the golf bag retention yoke 14 having integrally formed at least one golf tee holder aperture 22 structured and operable to removably retain a golf tee. In yet other various embodiments, the present disclosure provides the golf car 10 comprising the golf bag retention yoke 14 having integrally formed therein both the at least one beverage container holder well 18, and the at least one golf tee holder aperture 22. The golf bag retention yoke 14 with the integrally formed beverage holder well(s) 18 and/or golf tee holder aperture(s) 22 provide convenience for golfers and enhance their experience. The beverage holder well(s) 18 and golf tee holder aperture(s) 22 will provide a convenient location for a beverage and golf tees adjacent to the golfer's golf bag while the golfer is outside the golf car 10.

Additionally, the golf car 10 generally includes a chassis or frame 26, a pair of rear wheels 30 and a pair of front wheels 34 operationally connected to the chassis 26, and a passenger compartment 38. The passenger compartment 38 generally includes an instrument panel or dash console 42, a floorboard 46, and a passenger seating structure 50. The instrument panel/dash console 42 can include one or more instrument displays, gauges, vehicle control devices and/or storage compartments. The passenger compartment 38 additionally includes a steering wheel 54 for use by the passenger/user to control the directional movement of the golf car 10, a brake pedal 58 for use by the passenger/user to control slowing and stopping of the golf car 10, and an accelerator pedal 62 for use by the operator to control the torque delivered by a prime mover (not shown) to one or more of the rear and/or front wheels 30 and/or 34. Particularly, the prime mover is operatively connected to a drivetrain (not shown) that is operatively connected between the prime mover and at least one of the rear and/or front wheels 30 and/or 34.

The golf car 10 further comprises a vehicle electrical power source such as one or more battery (not shown) that is structured and operable to provide electrical power to various electrical components of the golf car 10 (e.g., an electric motor prime mover, and other vehicle electrically operated modules and components), The prime mover can be any device that is structured and operable to generate torque (e.g., motive force, e.g., power) utilized to provide motive force for the golf car 10 via the drivetrain. For example, in various embodiments, the prime mover can be an internal combustion engine (ICE), an electric motor, a hybrid combination of an ICE and an electric motor, or any other suitable motive power source.

The golf car 10 further includes a front body portion 66 and a rear body portion 70. The rear body portion 70 is formed to comprise a rear deck 74 and a golf bag well 78. The golf bag well 78 is structured and operable to have golf bags disposed therein and to retain the bottom portions of the golf bags. Disposed above the rear deck 74 and golf bag well 78 the golf car 10 comprises an accessory basket and yoke combination structure 82 that is mounted to the rear deck 74 and/or the seating structure 50 and/or canopy struts 86 that support a canopy panel 90 above the passenger compartment 38. The accessory basket and yoke combination structure 82 comprises an accessory basket 94 that is structured and operable to hold various golfer accessory items such as golf club covers, a small cooler, golf hats, jackets, towels, golf balls, gloves and other golfer personal items and equipment. The accessory basket and yoke combination structure 82 additionally comprises the golf bag retention yoke 14 that is integrally formed with or otherwise connected to and disposed around a top portion or top edge of the accessory basket 94.

The golf bag retention yoke 14 includes a pair of arcuate collars 98, a pair of retention straps 102 and a pair of retention strap clamps 106. The retention straps 102 are fixed at proximal ends to the innermost or centermost ends of the collars 98 (i.e., ends of the collars 98 that are in the middle of the yoke 14). The opposing distal ends of the retention straps 102 are free and unencumbered (i.e., unattached). The retention strap clamps 106 are disposed at the outermost ends of the collars 98 (i.e., ends of the collars 98 that are adjacent the lateral sides of the golf car 10). The retention strap clamps 106 are structured and operable to adjustably retain the distal ends of the retention straps 102. The arcuate collars 98 are shaped to cradle top portion of the golf bags and the retention straps are structured and operable to wrap around the top portion of the golf bags, whereafter the distal ends are inserted into the retention strap clamps 106 whereafter the strap clamps 106 are operated to securely retain the retention straps 102 such that the golf bags are held within the collars 98 and retained within the bag wells 78.

Referring now to FIGS. 1, 2, 3, 4, 5, 6 and 7, as described above, the bag retention yoke 14 is integrally formed with or otherwise connected to and disposed around the top edge or top portion of the accessory basket 94. The bag retention yoke 14 further comprises a pair of lateral arms 110 that are integrally formed with or otherwise connected to the lateral ends of the accessory basket 94 (i.e., the sides of the accessory basket 94 that corresponds to the sides of the golf car 10). The yoke lateral arms 110 extend forward (i.e., extend toward the front of the golf car 10) from the distal ends of the collars 98 that are disposed along a rearward top edge or top portion of the accessory basket 82.

More particularly, the golf bag retention yoke 14 includes a driver's side portion 114 disposed on, associated with and adjacent with the driver's side of the golf car 10, and passenger's side portion 118 disposed on, associated with and adjacent with the passenger's side of the golf car 10.

Moreover, the pair of arcuate collars 98 comprise a driver's side collar 98 that is included in the golf bag retention yoke driver's side portion 114, and a passenger's side collar 98 that is included in the golf bag retention yoke passenger's side portion 118. Similarly, the pair of retention straps 102 comprise a driver's side retention strap 102 that is fixed at the proximal end to the innermost or centermost end of the driver's side collar 98 and is included in the golf bag retention yoke driver's side portion 114, and a passenger's side retention strap 102 that fixed at the proximal end to the innermost or centermost end of the passenger's side collars 98 and is included in the golf bag retention yoke passenger's side portion 118. Additionally, the pair of retention strap clamps 106 comprise a driver's side retention strap clamp 106 that is disposed at an outermost end of the driver's side collar 98 and is structured and operable to adjustably retain the distal end of the driver's side retention strap 102 and is included in the golf bag retention yoke driver's side portion 114, and a passenger's side strap clamp 106 that is disposed at an outermost end of the passenger's side collar 98 and is structured and operable to adjustably retain the distal end of the passenger's side retention strap 102 and is included in the golf bag retention yoke passenger's side portion 118. Still further, the pair of lateral yoke arms 110 comprise a driver's side arm 110 that is integrally formed with and extends forward from the distal end of the driver's side collar 98 and is included in the golf bag retention yoke driver's side portion 114, and a passenger's side arm 110 that is integrally formed with and extends forward from the distal end of the passenger's side collar 98 and is included in the golf bag retention yoke passenger's side portion 118.

The collars 98 each have a rear face 98A against which the golf bags are cradled, and a top face 98B extending forward from the rear faces 98A. Similarly, the yoke arms 110 each comprise a side face 110A and a top face 110B extending inward from the side faces 110A and forward from the collar top faces 98B. The beverage holder well(s) 18 and/or the golf tee holder aperture(s) 22 are disposed and formed in at least one of the yoke arms top faces 110B and the yoke collar top face 98B.

In various embodiments, the beverage holder well(s) 18 comprise a sidewall that extends downward from the respective the yoke arm top face 110B and/or the respective yoke collar top face 98B and bottom wall joining the sidewall to define a well or reservoir. The bottom wall provides a bottom surface on which the respective beverage container (e.g., a cup, can, bottle, thermos etc.) can rest and the sidewall provides a means for retaining the respective beverage container within the beverage holder well 18. In various embodiments, the golf tee holder aperture(s) 22 comprise a hole, orifice or aperture that is formed in the respective yoke arm top faces 110B and/or the respective yoke collar top face 98B such that a golf tee can be inserted through a golf tee holder aperture 22 and dangle and be retained therein. Alternatively, in various embodiments the golf tee holder aperture(s) 22 can comprise a hole, orifice or aperture that is formed in the respective yoke arm top face 110B and/or the respective yoke collar top face 98B and have a sidewall extending downward such that a golf tee can be inserted therein and the stem of the golf tee will contact the sidewall and be removably bound, pinched or friction fit within the golf tee holder aperture 22.

As described above, the golf bag retention yoke 14 comprises at least one beverage holder well 18. For example, in various embodiments, the golf bag retention yoke 14 can comprise two beverage holder wells 18 disposed on opposing portions or sides of the golf bag retention yoke 14. Specifically, in such embodiments, the golf bag retention yoke 14 can comprise one beverage holder well 18 formed in the driver's side portion of the yoke 14 and one beverage holder well 18 formed in the passenger's side portion of the yoke 14, thereby providing a beverage holder well 18 conveniently located for the driver of the golf car 10 when standing outside of the passenger compartment 38 and a beverage holder well 18 conveniently located for the passenger of the golf car when standing outside of the passenger compartment 38. For example, as exemplarily illustrated in FIGS. 1, 3, 4 and 6 the golf bag retention yoke 14 comprises one beverage holder well 18 formed at the junction of the collar top face 98B and the yoke arm top face 110B of the driver's side portion 114, and one beverage holder well 18 formed at the junction of the collar top face 98B and the yoke arm top face 110B of the passenger's side portion 114.

In various other embodiments, the golf bag retention yoke 14 comprises at least two beverage holder wells 18 disposed on opposing portions or sides of the golf bag retention yoke 14. Specifically, in such embodiments, the golf bag retention yoke 14 can comprise two or more beverage holder well 18 formed in the driver's side portion of the yoke 14 and two or more beverage holder well 18 formed in the passenger's side portion of the yoke 14, thereby providing at least two beverage holder wells 18 conveniently located for the driver of the golf car 10 when standing outside of the passenger compartment 38 and at least two beverage holder wells 18 conveniently located for the passenger of the golf car when standing outside of the passenger compartment 38. For example, as exemplarily illustrated in FIGS. 5 and 7 the golf bag retention yoke 14 comprises one beverage holder well 18 formed at the junction of the collar top face 98B and the yoke arm top face 110B of the driver's side portion 114, one or more beverage holder well 18 formed the yoke arm top face 110B of the driver's side portion 114, one beverage holder well 18 formed at the junction of the collar top face 98B and the yoke arm top face 110B of the passenger's side portion 114, and one or more beverage holder well 18 formed the yoke arm top face 110B of the passenger's side portion 114.

Hence, the golf bag retention yoke 14 can include one or more beverage holder well 18 formed anywhere along the entire top face 98B of the collar 68 and/or the along entire top face 110B of the yoke arm 110 of the driver's side portion 114 of the golf bag retention yoke 14, and/or the entire top face 98B of the collar 68 and/or the along entire top face 110B of the yoke arm 110 of the passenger's side portion 118 of the golf bag retention yoke 14. Additionally, the one or more beverage holder well 18 can have any shape, size and/or dimensions to accommodate any size beverage container and remain within the scope of the present disclosure. Furthermore, in embodiments wherein the golf bag retention yoke 14 includes a plurality of beverage holder well 18, various different ones of the plurality of beverage holder well 18 can have various different shapes, sizes and/or dimensions and remain within the scope of the present disclosure.

As described above, the golf bag retention yoke 14 comprises at least one golf tee holder aperture 22. For example, in various embodiments, the golf bag retention yoke 14 can comprise golf tee holder apertures 22 disposed on opposing portions or sides of the golf bag retention yoke 14. Specifically, in such embodiments, the golf bag retention yoke 14 can comprise one or more golf tee holder aperture 22 formed in the driver's side portion of the yoke 14 and one or more golf tee holder aperture 22 formed in the passenger's side portion of the yoke 14, thereby providing at least one golf tee holder aperture 22 conveniently located for the driver of the golf car 10 when standing outside of the passenger compartment 38 and at least one golf tee holder aperture 22 conveniently located for the passenger of the golf car when standing outside of the passenger compartment 38. For example, as exemplarily illustrated in FIGS. 4 and 5 the golf bag retention yoke 14 comprises a plurality of golf tee holder apertures 22 formed in the centermost portion of the collar top face 98B of the driver's side portion 114 (e.g., adjacent the proximal end of the driver's side collar 98), and a plurality of golf tee holder aperture 22 formed at the centermost portion of the collar top face 98B of the passenger's side portion 114 (e.g., adjacent the proximal end of the passenger's side collar 98). Alternatively, FIGS. 2, 3, 6 and 7 exemplarily illustrate the golf bag retention yoke 14 comprises a plurality of golf tee holder apertures 22 formed in the centermost portion of the collar top face 98B and along the top face 110B of the yoke arm 110 of the driver's side portion 114, and a plurality of golf tee holder aperture 22 formed at the centermost portion of the collar top face 98B and along the top face 110B of the yoke arm 110 of the passenger's side portion 114

The description herein is merely exemplary in nature and, thus, variations that do not depart from the gist of that which is described are intended to be within the scope of the teachings. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the disclosure. Such variations and alternative combinations of elements and/or functions are not to be regarded as a departure from the spirit and scope of the teachings.

What is claimed is:

1. A golf bag retention yoke, said yoke comprising:
 at least one beverage container holder well integrally formed therein, wherein the at least one beverage container holder well is structured and operable to removably retain a beverage container;
 a pair of arcuate collars comprising a driver's side collar, and a passenger's side collar;
 a pair of retention straps comprising a driver's side retention strap and a passenger's side retention strap;
 a pair of strap clamps comprising a driver's side strap clamp structured and operable to adjustably retain a distal end of the driver's side retention strap, and a passenger's side strap clamp structured and operable to adjustably retain a distal end of the passenger's side retention strap; and
 a pair of lateral arms comprising a driver's side arm that is integrally formed with and extends forward from a distal end of the driver's side collar, and a passenger's side arm that is integrally formed with and extends forward from a distal end of the passenger's side collar, wherein
 the at least one beverage holder well is formed in at least one of:
  a junction of the driver's side collar and the driver's side arm; and
  a junction of the passenger's side collar and the passenger's side arm.

2. The golf bag retention yoke of claim 1, wherein the at least one beverage container holder well further comprises a plurality of beverage container holder wells formed at a plurality of locations along the arcuate collars and the lateral arms.

3. The golf bag retention yoke of claim 1 further comprising at least one golf tee holder aperture structured and operable to removably retain a golf tee.

4. The golf bag retention yoke of claim 3 further comprising:

a pair of retention straps comprising a driver's side retention strap, and a passenger's side retention strap;

a pair of strap clamps comprising a driver's side strap clamp structured and operable to adjustably retain a distal end of the driver's side retention strap, and a passenger's side strap clamp structured and operable to adjustably retain a distal end of the passenger's side retention strap; and a pair of lateral arms comprising a driver's side arm that is integrally formed with and extends forward from the distal end of the driver's side collar, and a passenger's side arm that is integrally formed with and extends forward from the distal end of the passenger's side collar, wherein the at least one golf tee holder aperture is formed in the innermost or centermost portion of the arcuate collars.

5. The golf bag retention yoke of claim 4, wherein the at least one golf tee holder aperture comprises a plurality of golf tee holder apertures formed at a plurality of locations along the arcuate collars and the lateral arms.

6. A golf bag retention yoke, said yoke comprising:

at least one golf tee holder aperture structured and operable to removably retain a golf tee;

a pair of arcuate collars comprising a driver's side collar and a passenger's side collar;

a pair of retention straps comprising a driver's side retention strap, and a passenger's side retention strap; and a pair of strap clamps comprising a driver's side strap clamp structured and operable to adjustably retain a distal end of the driver's side retention strap, and a passenger's side strap clamp structured and operable to adjustably retain a distal end of the passenger's side retention strap; and a pair of lateral arms comprising a driver's side arm that is integrally formed with and extends forward from the distal end of the driver's side collar, and a passenger's side arm that is integrally formed with and extends forward from the distal end of the passenger's side collar, wherein the at least one golf tee holder aperture is formed in the innermost or centermost portion of the arcuate collars.

7. The golf bag retention yoke of claim 6, further comprises a plurality of golf tee holder apertures formed at a plurality of locations along the arcuate collars and the lateral arms.

8. The golf bag retention yoke of claim 6 further comprising at least one beverage container holder well integrally formed therein, wherein the at least one beverage container holder well is structured and operable to removably retain a beverage container.

9. The golf bag retention yoke of claim 8 further comprising:

a pair of arcuate collars comprising a driver's side collar and a passenger's side collar, wherein the driver's side arm is integrally formed with and extends forward from a distal end of the driver's side collar, and the passenger's side arm that is integrally formed with and extends forward from a distal end of the passenger's side collar;

a pair of retention straps comprising a driver's side retention strap, and a passenger's side retention strap;

a pair of strap clamps comprising a driver's side strap clamp structured and operable to adjustably retain a distal end of the driver's side retention strap, and a passenger's side strap clamp structured and operable to adjustably retain a distal end of the passenger's side retention strap; and the at least one beverage holder well is formed in at least one of:

a junction of the driver's side collar and the driver's side arm; and a junction of the passenger's side collar and the passenger's side arm.

10. The golf bag retention yoke of claim 9, wherein the at least one beverage container holder well comprises a plurality of beverage container holder wells formed at a plurality of locations along the arcuate collars and the lateral arms.

11. A golf car, said golf car comprising:

a golf bag retention yoke, wherein the golf bag retention yoke comprises:

at least one beverage container holder well integrally formed therein, wherein the at least one beverage container holder well is structured and operable to removably retain a beverage container;

at least one golf tee holder aperture integrally formed therein and structured and operable to removably retain a golf tee;

a pair of arcuate collars comprising a driver's side collar and a passenger's side collar;

a pair of retention straps comprising a driver's side retention strap, and a passenger's side retention strap;

a pair of strap clamps comprising a driver's side strap clamp structured and operable to adjustably retain a distal end of the driver's side retention strap, and a passenger's side strap clamp structured and operable to adjustably retain a distal end of the passenger's side retention strap; and a pair of lateral arms comprising a driver's side arm that is integrally formed with and extends forward from the distal end of the driver's side collar, and a passenger's side arm that is integrally formed with and extends forward from the distal end of the passenger's side collar, wherein the at least one beverage holder well is formed in at least one of:

a junction of the driver's side collar and the driver's side arm; and a junction of the passenger's side collar and the passenger's side arm.

12. The golf car of claim 11, wherein the at least one golf tee holder aperture is formed in the innermost or centermost portion of the arcuate collars.

13. The golf car of claim 11, wherein the at least one beverage container holder well further comprises a plurality of beverage container holder wells formed at a plurality of locations along the arcuate collars and the lateral arms.

14. The golf car of claim 11, wherein the at least golf tee holder aperture comprises a plurality of golf tee holder apertures formed at a plurality of locations along the arcuate collars and the lateral arms.

\* \* \* \* \*